G. F. LANGHECK.
ADVERTISING DEVICE.
APPLICATION FILED MAY 10, 1915.
1,210,955.
Patented Jan. 2, 1917.
3 SHEETS—SHEET 1.
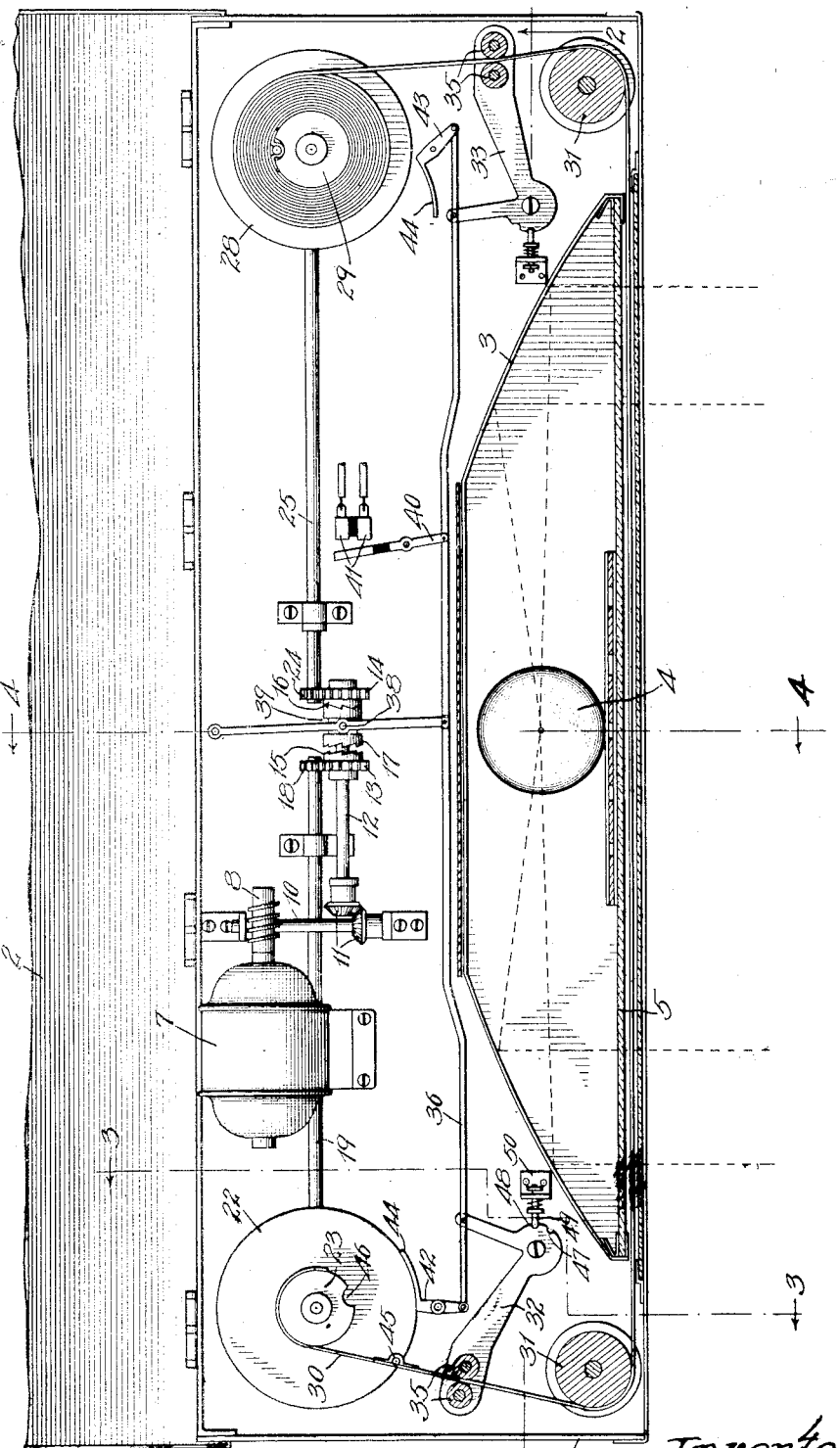

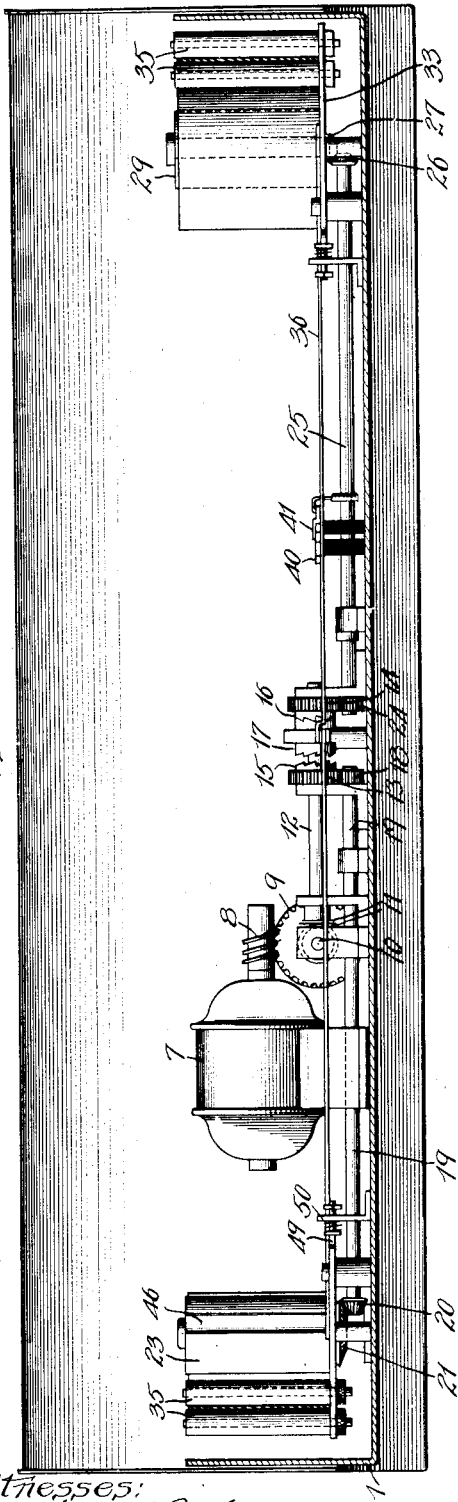

G. F. LANGHECK.
ADVERTISING DEVICE.
APPLICATION FILED MAY 10, 1915.
1,210,955.
Patented Jan. 2, 1917.
3 SHEETS—SHEET 3.
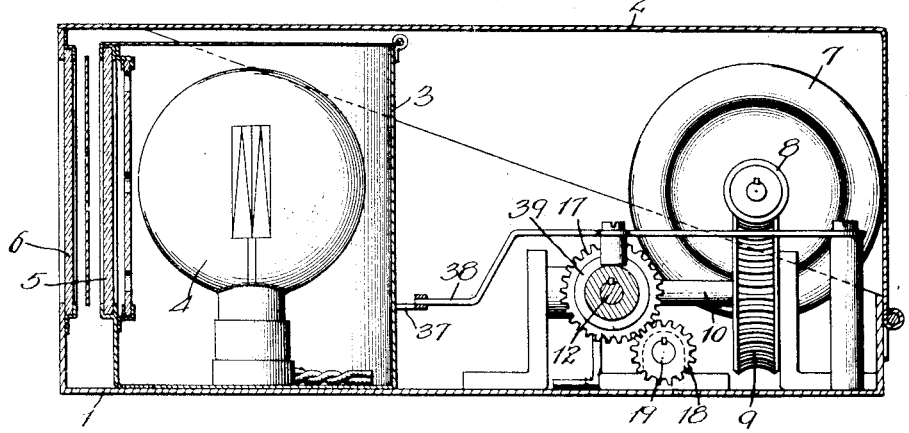
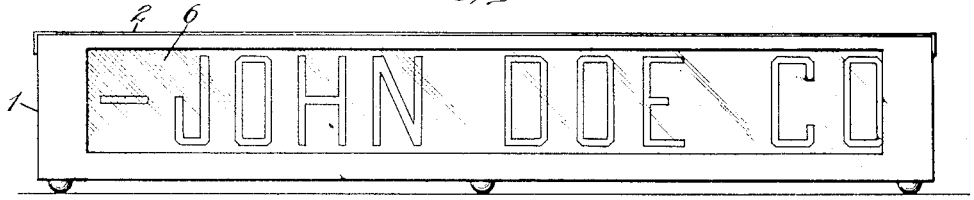
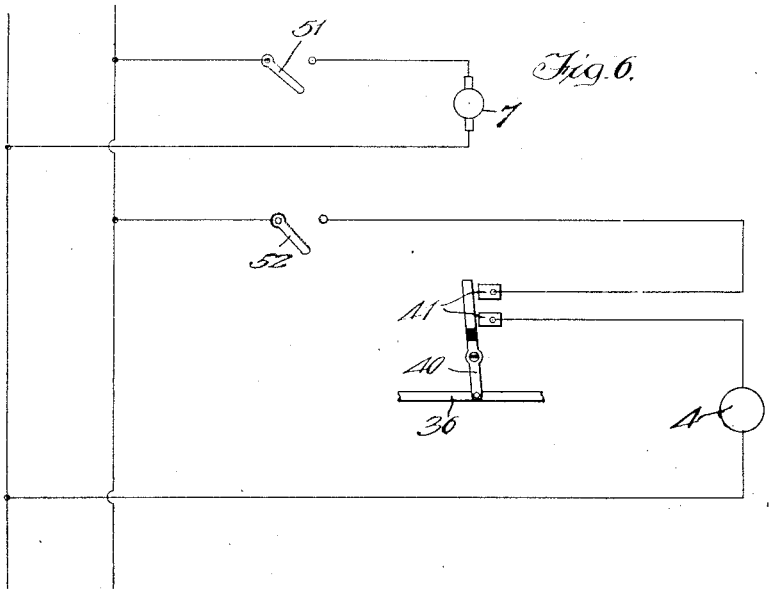
Witnesses:
Arthur W. Carlson
Robert F. Weir
Inventor:
Gustavus F. Langheck
By Rudolph Wm. Lotz
Atty.

UNITED STATES PATENT OFFICE.

GUSTAVUS F. LANGHECK, OF CHICAGO, ILLINOIS.

ADVERTISING DEVICE.

1,210,955.  Specification of Letters Patent.  Patented Jan. 2, 1917.

Application filed May 10, 1915. Serial No. 27,236.

*To all whom it may concern:*

Be it known that I, GUSTAVUS F. LANGHECK, citizen of the United States, residing at Chicago, in the county of Cook and State of Illinois, have invented certain new and useful Improvements in Advertising Devices; and I do hereby declare the following to be a full, clear, and exact description of the invention, such as will enable others skilled in the art to which it appertains to make and use the same.

This invention has for its object to provide an improved show window advertising device which is also capable of being embodied on a larger scale for other display advertising purposes in public places.

The particular object of the invention is to provide an advertising device which will present a succession of words constituting an advertising statement; said words being caused to travel from right to left over a framed open space in which the same are visible; the said words, or letters composing the same, or the space over which they pass being so illuminated as to render the words easily visible and readable.

A further particular object of the invention is to provide an advertising device of the general character defined, in which the words to be successively displayed are disposed on a traveling web which is alternately moved in respectively opposite directions so as to cause the advertising matter displayed on the web to be rendered visible for reading at successive separate intervals.

A further object of the invention is to provide mechanism for automatically imparting forward and reverse movement to the traveling web at predetermined intervals.

A futher object of the invention is to provide in connection with the aforesaid mechanism for effecting travel of the web, means for automatically closing and opening an electric circuit through illuminating devices adapted to illuminate the space over which the web travels visibly from the exterior of the housing of the device.

Other objects of the invention will appear from the following specification:

In the accompanying drawings illustrating a suitable embodiment of the invention: Figure —1— is a top plan view partly in horizontal section of an advertising device constructed in accordance with my invention. Fig. —2— is a vertical longitudinal section of the same on the line 2—2 of Fig. —1—. Fig. —3— is a vertical transverse section of the same on the line 3—3 of Fig. —1—. Fig.—4— is a vertical transverse section on the line 4—4 of Fig. —1—. Fig. —5— is a view in front elevation of the device. Fig. —6— is a detail diagrammatic view showing means for effecting automatic opening and closing of the electric lamp circuit of the device.

My device comprises a suitable housing preferably of sheet metal, and consists of the receptacle 1 open at the top and equipped with a cover 2 hinged to the rear wall of the receptacle 1. Within the latter, contiguous to the front wall thereof, is a housing 3 for illuminating means such as the incandescent lamp 4, said housing 3 being provided with an open front containing a pane 5 of glass which is preferably translucent. The front wall of the receptacle 1 is similarly provided with an opening in which a pane 6 of transparent glass is mounted. The remainder of the receptacle 1 contains the motor and mechanism actuated thereby for effecting travel between the translucent pane 5 and the transparent pane 6, of a web containing advertising matter. Said mechanism comprises the motor 7, preferably an electric motor, the shaft of which carries a worm 8 meshing with a worm wheel 9 on a countershaft 10. The latter is geared by means of the miter gears 11 with a second countershaft which carries two spur gears 13 and 14, both rotatable thereon, and each of which is rigid with a clutch member 15 and 16 respectively. Keyed on said countershaft 12 between said clutch members 15 and 16, and slidable on said shaft is a clutch member 17 of well-known construction by means of which either of said gears 13 or 14 may be caused to rotate with said shaft 12.

The spur gear 13 meshes with a spur gear 18 on a countershaft 19, which at its other end carries a bevel pinion 20, which meshes with a bevel gear 21 rigid with the bottom plate of a reel 22 with which a spool 23 is adapted to be engaged to be rotated. The spur gear 14 similarly meshes with a spur gear 24 on a countershaft 25 which at its other end carries a miter gear 26 meshing with a miter gear 27 rigid with the bottom plate of a reel 28 with which a spool 29 is adapted to be engaged to be rotated thereby, said reels 22 and 28 being rotated in respectively opposite directions. Secured at its respective ends to said spools 23 and 29 is a web or strip 30 of paper or any other suitable flexible material upon which words forming complete sentences are printed or otherwise displayed. Said web or strip 30 is adapted to be automatically wound upon said spools 23 and 29 and vice versa unwound from the same. Between its ends said web is trained over idle rolls 31 disposed in the forward corners of the receptacle 1 at either end of the receptacle 3. Pivotally mounted on vertical axes contiguous to the said idle rolls 31 are two bell crank levers 32 and 33, the long arms of which are equipped with pairs of parallel vertically disposed idle rolls 35 between which the said web passes in travel. Both the short arms of said levers 32 and 33 are connected with a rod 36 which is connected between its ends with a lever 37 provided between its ends with a projection 38 engaging in the annular groove 39 of the clutch member 17, and which is pivotally secured at its other end to a wall of the receptacle 1 in any suitable manner. Said rod 36 is similarly connected with one end of a switch lever 40 pivotally secured between its ends to the bottom wall of the receptacle 1, and which engages in the knife switch members 41 mounted on the bottom of said receptacle and controlling the electric circuit through the lamp 4. Associated with each of said reels 22 and 28 is a brake member 42 and 43 respectively, each of which comprises a lever pivotally secured between its ends to the bottom of the receptacle 1 and connected at one end with an end of said rod 36, the other ends of said levers carrying brake shoes 44 adapted to bear upon the periphery of the bottom plates of said reels 22 and 28 for retarding the rotation of the latter.

Mounted on the web 30 contiguous to the respective ends thereof attached to the spools 23 and 29 are two vertically disposed ribs or projections 45, each of which is adapted to normally lie in a longitudinal recess or groove 46 in the contiguous spool 23 or 29 respectively, said projections 45 being incapable of passing between the respective pairs of rollers 35 and adapted when engaged with the latter during the travel of said web in being unwound from one of said spools, to pivotally turn the bell-crank lever carrying said rollers 35 to impart longitudinal movement to the rod 36 to throw the clutch 17, to open or close the switch 41, and to throw one of the brake shoes 44 into engagement with one of said rails. The hub of each of said bell crank levers 33 and 32 is provided with a pair of peripheral notches 47 and 48 respectively, in which a spring-actuated latch member or plunger 49 is adapted to engage; said latch member or plunger 49 being longitudinally movable in a suitable guide 50 mounted on the bottom of the receptacle 1 and being normally held in engagement with the said hub by its spring.

The operation of the device is as follows: In the position of the parts shown in Fig. —1—, the web 30 is being unwound from the spool 23 and has been almost completely unwound therefrom. The clutch member 17 is engaged with the spur gear 14 thus driving the countershaft 25 and reel 28. The lamp circuit is open and one of the brake-shoes is engaged with the reel 22. The bell-crank lever 32 is disposed with its long arm at the inner limit of its movement. The projection 45 is approaching the rollers 35 of said lever 32 and the web is traveling at its highest speed. As the projection 45 engages the rollers 35 of the bell-crank lever 32 the latter will be thrown into position so that its long arm is disposed more nearly contiguous to the idle roll 31 at that end of the machine. The said lever is thrown to this position against the action of the latch 49, which is forced out of the notch 48 and into the notch 47. Through the connection of the bell crank lever 32 with the bell crank lever 33, effected by the rod 36, said lever 33 will be thrown to the position relative to the reel 28 that the lever 35 is shown to hold in Fig. —1— relative to the reel 22. The movement of the rod in the last-named direction causes the clutch 17 to be thrown to release the gear 14 and engage the gear 13 thereby rotating the countershaft 19 and reel 22 in the direction to cause the web to be wound upon the spool 23. At the same time the switch 41 is closed to close the circuit through the lamp 4 and the brake lever 43 is thrown to cause the shoe 44 thereof to engage the bottom plate of the reel 28, while the lever 42 is thrown to release the brake shoe 44 thereof from engagement with the bottom plate of the reel 22.

Upon reference to Fig. —2— it will be seen that the bevel gear 21 is of about twice the diameter of the bevel pinion 20 meshing therewith, whereas the miter gears 26 and 27 are of equal diameter. Consequently the reel 22 will be rotated at about one-half the speed of the reel 28, thereby causing the web to be wound upon the spool 23 more slowly than it will be wound upon the spool 29. In the travel of the web in this direction (from right to left) the words displayed upon the same become successively readably visible through the pane 6, and may be successively read in proper order to form the sentences. The unwinding of the web from the spool 29 is resisted by the resistance to rotation offered by the brake shoe 44 engaging said bottom plate of the reel 28, thus causing said web to be wound upon the spool 23 under a relatively constant tension. As soon as the web is practically completely unwound from said spool 29 the projection 45 at said end of the web will engage the rollers 35 on the bell-crank lever 33 and thus return the several parts mentioned to the position shown in Fig. —1—, thereby causing the web to move in its reverse direction at double the speed of travel in the obverse direction, and during this time, by the opening of the lamp circuit, the words displayed on the web will remain invisible.

The device is, of course, capable of being employed during the day as well as the night and when so employed the electric lamp circuit is maintained open by opening the manual switch 52, shown in Fig. —6—. The device is stopped and started by means of the manual switch 51 which controls the motor circuit.

The spools 23 and 29 are removable from the spindles of said reels 22 and 28 and are engaged against rotation therewith when mounted thereon; this being effected in any suitable manner.

Webs containing various advertising matter may be interchangeably used in the device in the same manner as motion picture reels are employed in projecting apparatus.

In the drawings I have illustrated a suitable embodiment of the invention without particular reference to specific details of construction; it being obvious that changes in construction may be made without departing from the invention as defined in the appended claims.

Attention is directed to the fact that the operation of the clutch mechanism, in particular, by means of projections carried by the web, is of the essence of the invention as thereby there is no danger of the web becoming gradually wound to a greater extent upon one of said spools than on the other thereof due to the lost motion in the intervals of throw of the clutch, and that thus absolute accuracy in the time of throwing the clutch is assured. The motor is, of course, operated constantly.

I claim as my invention:

1. In an advertising device of the kind specified, a motor, a one direction rotatable shaft geared to the motor, a pair of oppositely rotatable reels geared to the shaft, clutch mechanism interposed between the reels and shaft for throwing the reels alternately into actuating relation to the shaft, a web connected at opposite ends to respective reels, stops on the web, a pair of bell-crank levers disposed to be operated by said stops, a bar connected to both bell-crank levers, and connection between said bar and the clutch mechanism, whereby as the web is unwinding from one reel the stop at such unwinding end will effect the operative connection of said reel with said shaft and the disconnection of the opposite reel for reversing the direction of movement of the web.

2. In an advertising device of the kind specified, a motor, a one direction rotatable shaft geared to the motor, a pair of oppositely rotatable reels geared to the shaft, clutch mechanism interposed between the reels and shaft for throwing the reels alternately into actuating relation to the shaft, a web connected at opposite ends to respective reels, stops on the web, a pair of bell-crank levers disposed to be operated by said stops, a longitudinally movable bar connected to both bell-crank levers, a clutch shifting lever operable by said bar, whereby as the web is unwinding from one reel the stop at such unwinding end will effect the operative connection of said reel with said shaft and the disconnection of the opposite reel for reversing the direction of movement of the web.

3. An advertising device including a motor, a pair of reels associated therewith to be alternately driven to effect travel of a web connected therewith alternately in opposite directions, said web adapted to be unwound from the idle reel, a brake associated with each reel, and motor-actuated means for automatically throwing the brake into engagement with the idle reel and simultaneously throwing the brake out of engagement with the driven reel.

4. An advertising device including a motor, a pair of reels associated therewith to be alternately driven thereby, one of said reels being idle while the other is driven, a web attached at its ends to said reels and adapted to be wound upon the driven reel and rotate the idle reel as it is unwound therefrom, and web actuated clutch and brake mechanism for automatically throwing said reels into operative relation to the motor and simultaneously therewith throwing the brakes to release the driven and engage the idle reel.

5. An advertising device including a motor, a pair of reels associated therewith to be alternately driven thereby, one of said reels being idle while the other is driven, a web attached at its ends to said reels and adapted to be wound upon the driven reel and rotate the idle reel as it is unwound therefrom, electric illuminating means associated with the visible surface of the web, an electric circuit controlling the same, a switch controlling said circuit, and switch actuating mechanism engaging the web and adapted to be actuated thereby for automatically opening and closing said circuit in accordance with the variation in direction of travel of said web.

6. An advertising device including a motor, a pair of reels associated therewith to be alternately driven thereby, one of said reels being idle while the other is driven, a web attached at its ends to said reels and adapted to be wound upon the driven reel and rotate the idle reel as it is unwound therefrom, clutch mechanism interposed between said reels and said motor for alternately effecting operative connection between said respective reels and said motor, electric illuminating means associated with the visible surface of the web, an electric circuit controlling the same, a switch controlling said circuit, and a switch and clutch actuating mechanism engaging the web and actuated thereby for simultaneously actuating the same to close said circuit as one of said reels is driven and open the same as the other of said reels is driven.

7. An advertising device including a motor, a pair of reels associated therewith to be alternately driven thereby, one of said reels being idle while the other is driven, a web attached at its ends to said reels and adapted to be wound upon the driven reel and rotate the idle reel as it is unwound therefrom, clutch mechanism interposed between said reels and said motor for alternately effecting operative connection between said respective reels and said motor, brake mechanism associated with said reels, electric illuminating means associated with the visible surface of the web, an electric circuit controlling the same, a switch controlling said circuit, and web actuated means common to said switch and said clutch mechanism, and said brake mechanism for simultaneously actuating the same to close said circuit as one of said reels is driven and open the same as the other of said reels is driven, and throw said brake mechanism to release the driven and engage the idle reel.

In testimony whereof I have signed my name in presence of two subscribing witnesses.

GUSTAVUS F. LANGHECK.

Witnesses:
R. W. LOTZ,
M. M. BOYLE.